United States Patent
Svensson

(10) Patent No.: US 9,001,949 B2
(45) Date of Patent: Apr. 7, 2015

(54) METHODS AND QAM RECEIVER FOR PERFORMING TIMING RECOVERY

(75) Inventor: Christer Svensson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/346,411

(22) PCT Filed: Sep. 23, 2011

(86) PCT No.: PCT/EP2011/066597
§ 371 (c)(1),
(2), (4) Date: Mar. 21, 2014

(87) PCT Pub. No.: WO2013/041147
PCT Pub. Date: Mar. 28, 2013

(65) Prior Publication Data
US 2014/0219396 A1    Aug. 7, 2014

(51) Int. Cl.
| | |
|---|---|
| *H04L 7/00* | (2006.01) |
| *H04L 7/02* | (2006.01) |
| *H04L 27/06* | (2006.01) |
| *H04L 27/38* | (2006.01) |
| H04L 27/00 | (2006.01) |

(52) U.S. Cl.
CPC .......... *H04L 27/066* (2013.01); *H04L 7/0054* (2013.01); *H04L 7/007* (2013.01); *H04L 27/38* (2013.01); *H04L 2027/0024* (2013.01)

(58) Field of Classification Search
CPC ..... H04L 27/06; H04L 27/38; H04L 27/3809; H04L 27/3827; H04L 7/033; H04L 7/04; H04L 7/08; H04L 7/041; H04L 7/042; H04L 7/046; H04L 7/0337; H04L 7/0338; H04J 3/0608; G11C 7/10; G06F 1/10
USPC .......................... 375/355, 362, 365, 371, 320
See application file for complete search history.

(56) References Cited

U.S. PATENT DOCUMENTS

| | | | | |
|---|---|---|---|---|
| 5,764,102 | A | * | 6/1998 | Cochran et al. ............... 329/304 |
| 7,778,363 | B2 | * | 8/2010 | Inagawa et al. ............... 375/343 |
| 8,184,756 | B2 | * | 5/2012 | Becker et al. ................. 375/355 |
| 2005/0036572 | A1 | | 2/2005 | Muhammad et al. |

* cited by examiner

*Primary Examiner* — Phuong Phu
(74) *Attorney, Agent, or Firm* — Coats & Bennett, P.L.L.C.

(57) ABSTRACT

A method in a QAM receiver (100) for performing timing recovery. The QAM receiver (100) is configured to receive a sequence of symbols. Each symbol is represented by a respective IQ pair comprising a respective inphase component I and a respective quadrature component Q. The QAM receiver (100) samples the respective I component and the respective Q component with a relative timing offset between the sampling of the respective I component and the respective Q component. The QAM receiver (100) establishes a first value associated to a quality of the I component samples, and a second value associated to a quality of the Q component samples, and compares the first value and second value to determine if the sampling timing should be advanced or delayed to improve the sample quality. The QAM receiver (100) adjusts subsequent sampling by advancing or delaying a sampling timing based on the comparison.

14 Claims, 5 Drawing Sheets

METHODS AND QAM RECEIVER FOR PERFORMING TIMING RECOVERY

TECHNICAL FIELD

Embodiments herein relate to a QAM receiver, and a method in a QAM receiver. In particular, embodiments herein relate to performing timing recovery.

BACKGROUND

A Quadrature Amplitude Modulation (QAM) receiver is arranged for receiving a signal representing successive symbols, each described by an IQ pair with an In-phase (I) component and a Quadrature (Q) component. In a QAM digital receiver, the signal is initially converted from the analog domain to the digital domain through Analog to Digital Converters (ADCs) that sample each IQ pair, i.e. the respective I component and the respective Q component of each IQ pair.

In such QAM digital receivers, a timing recovery arrangement aims at determining the time instants at which the I and Q components are as largest, that is, determining an optimum time instant for sampling the IQ pair, to facilitate the detection of the symbols from the IQ sample pair.

Three methods of timing recovery are well known; Early-late gate algorithm, Mueller and Muller algorithm and Gardner algorithm.

Early-late gate algorithm requires three IQ sample pairs per symbol; two IQ sample pairs to determine the sampling timing error for performing timing recovery, and one IQ sample pair for the actual sampling for decoding purposes.

A problem is that for systems with very high symbol rates, it may be too expensive to use oversampling, i.e. sampling the each IQ pair more than once per symbol.

Mueller and Muller algorithm uses two IQ sample pairs per symbol. A problem with this algorithm is however that it works only after carrier recovery, which may be a drawback, as carrier recovery may be better performed on a timing recovered signal.

Gardner algorithm also uses two IQ sample pairs per symbol, and is probably the most common algorithm. However, a further problem is that in systems with very high speed symbol rates, even using only two IQ sample pairs per symbol for timing recovery may prove too costly and difficult.

SUMMARY

In view of the discussion above, it is hence an object for embodiments herein to provide an improved way of performing timing recovery in a QAM receiver. In particular, it is an object for embodiments herein to provide a way of performing timing recovery in a QAM receiver without using oversampling.

According to a first aspect, the object is achieved by a method in a quadrature amplitude modulation, QAM, receiver for performing timing recovery. The QAM receiver is configured to receive a signal comprising a sequence of symbols. Each symbol is represented by a respective IQ pair comprising a respective inphase, I, component and a respective quadrature, Q, component. The QAM receiver samples the respective I component and the respective Q component of each IQ pair. The sampling is performed with a relative timing offset between the sampling of the respective I component and the sampling of the respective Q component. The QAM receiver establishes a first value associated to a quality of I component samples, and a second value associated to a quality of Q component samples. The QAM receiver compares the first value and the second value to determine if the sampling timing is to be advanced or delayed to improve the sample quality. The QAM receiver adjusts, to improve the sample quality, subsequent sampling by advancing or delaying a sampling timing based on the comparing, thereby performing timing recovery.

According to a second aspect, the object is achieved by a quadrature amplitude modulation, QAM, receiver comprising an arrangement for performing timing recovery. The QAM receiver is configured to receive a signal comprising a sequence of symbols, wherein each symbol is represented by a respective IQ pair comprising a respective inphase, I, component and a respective quadrature, Q, component. The arrangement comprises a first analog to digital converter, ADC, configured to sample the respective I component of each IQ pair. The arrangement further comprises a second ADC. The second ADC is configured to sample the respective Q component of each IQ pair. The arrangement also comprises an offset element. The offset element is configured to provide a relative timing offset between the sampling of the respective I component and the sampling of the respective Q component. The arrangement comprises a first quality detector. The first quality detector is configured to establish a first value associated to a quality of I component samples. The arrangement comprises a second quality detector configured to establish a second value associated to a quality of Q component samples. The arrangement further comprises a comparing unit configured to compare the first value and the second value to determine if the sampling timing is to be advanced or delayed to improve the sample quality. The arrangement comprises an adjustment unit. The adjustment unit is configured to adjust subsequent sampling to improve the sample quality. The adjustment is performed by advancing or delaying a sampling timing based on a result from the comparing unit, thereby performing timing recovery.

Thanks to the respective I component sampling and the respective Q component sampling in each respective IQ pair being offset in time from one another, it is possible to determine a relative quality of the I and Q component samples. Hence, it is possible to determine if the sampling timing should be advanced or delayed to improve the sample quality, since the quality of the respective I component samples and the quality of the respective Q component samples are representative of different respective sampling timings. Hence, the timing error direction may be determined, and timing recovery may thus be performed by adjusting in a direction that reduces the timing error, i.e. by advancing or delaying the sampling timing of subsequent sampling. As previously mentioned, for systems with very high symbol rates, it may be expensive, and/or even impossible, to use oversampling for timing recovery purposes. According to embodiments herein, timing recovery can be performed using only the IQ sample pair needed for symbol decoding, without performing extra sampling solely for timing recovery purposes. This provides an improved way of performing timing recovery.

DETAILED DESCRIPTION

Figure 1:
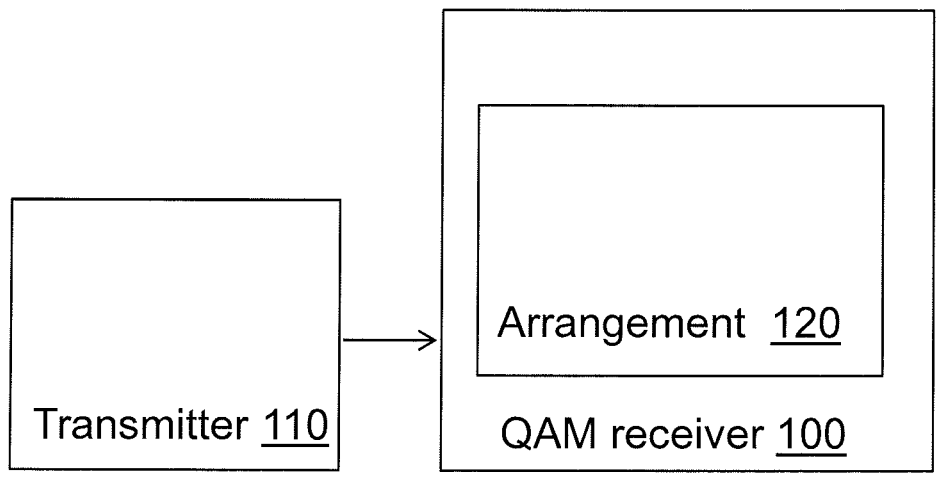
FIG. 1 is a schematic block diagram illustrating a QAM receiver.

FIG. 1 schematically illustrates a QAM receiver 100 according to embodiments herein. The QAM receiver 100 is a digital QAM receiver that is arranged for receiving, from a transmitter 110, a signal representing successive symbols, each described by an IQ pair with an In-phase, I, component and a Quadrature, Q, component. In the QAM receiver 100, the signal is initially converted from the analog domain to the digital domain through ADS:s that sample each IQ pair, i.e. the respective I component and the respective Q component of each IQ pair.

The QAM receiver 100 comprises an arrangement 120, for performing timing recovery. The arrangement 120 aims at determining the time instants at which the I and Q components are as largest, that is, determining an optimum time instant for sampling each IQ pair, to facilitate the detection of the symbols from the IQ sample pair.

It is to be understood that the QAM receiver 100 depicted in FIG. 1 is illustrated for the specific purpose of this disclosure of embodiments herein relating to timing recovery, and that the QAM receiver 100 in reality further comprises several other parts which are not shown in the FIG. 1.

Figure 2:
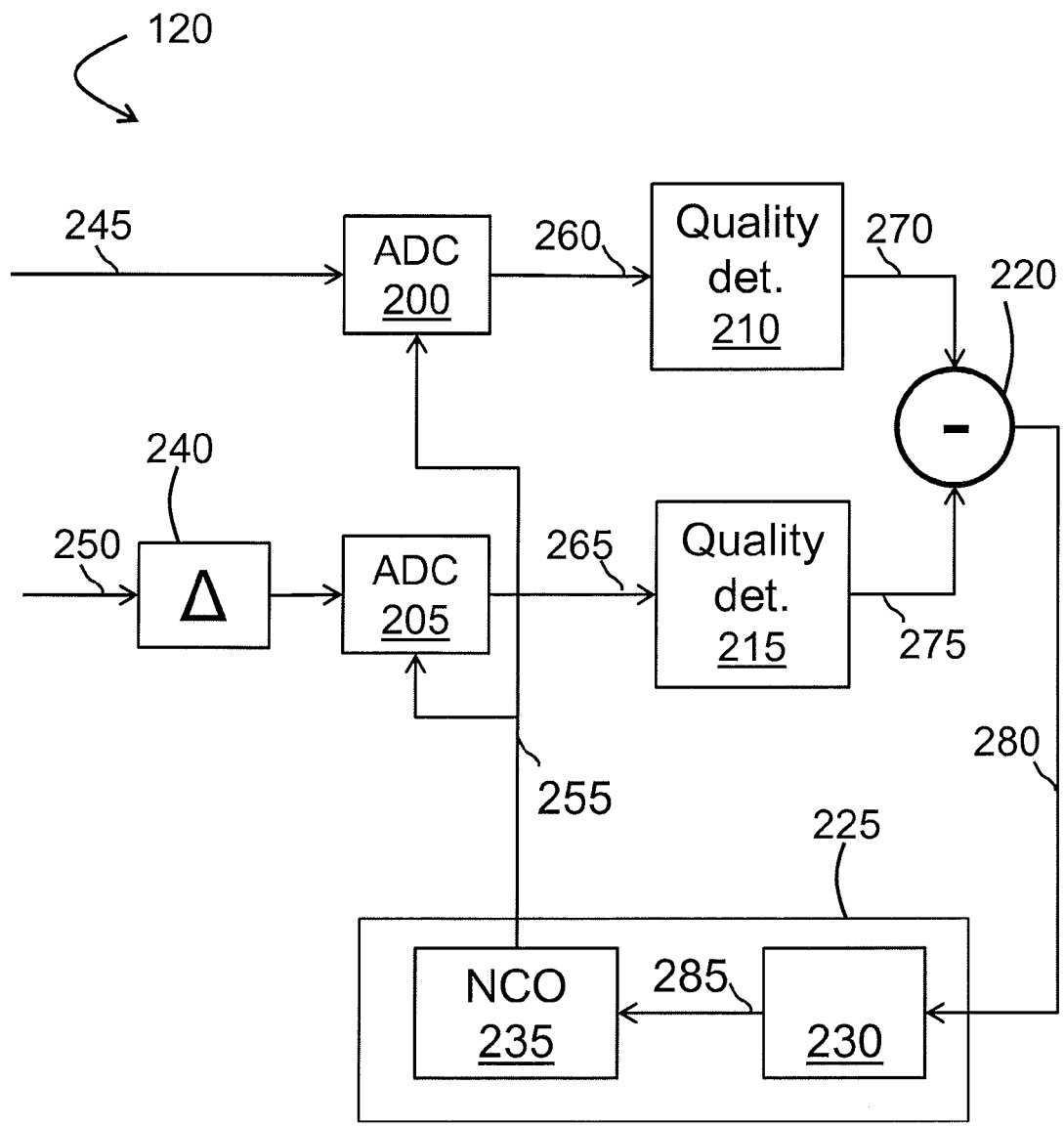
FIG. 2 is a schematic block diagram and flowchart illustrating embodiments of a method and an arrangement in a QAM receiver for performing timing recovery.

FIG. 2 is a schematic combined block diagram and flowchart illustrating some embodiments of the arrangement 120 for performing timing recovery depicted in FIG. 1.

The arrangement 120 comprises a first Analog to Digital Converter (ADC) 200 and a second ADC 205. The arrangement 120 further comprises a first quality detector 210 and a second quality detector 215. The arrangement 120 further comprises a comparison unit 220.

Further comprised in the arrangement 120 is an adjustment unit 225, which in this example comprises a controller 230 and a Numerically Controlled Oscillator (NCO) 235. An offset element 240, which in this example is a delay element, is also comprised in the depicted arrangement 120.

The operation of the arrangement 120 will now also be described with reference to FIG. 2. When a symbol in the form of an IQ pair is received in the arrangement 120, an I component 245 of the IQ pair enters the first ADC 200, and a Q component 250 of the same IQ pair enters the second ADC 205.

The respective first and second ADC 200, 205 then sample the respective I and Q components 245, 250. A sampling timing is determined by a clock signal 255 from the NCO 235.

The output from the first ADC 200 is an I component sample 260 of the I component 245, which I component sample 260 then enters the first quality detector 210. Accordingly, a Q component sample 265 of the Q component 250 is output from the second ADC 205, and enters the second quality detector 215.

From the first quality detector 210, a first value 270 is output. The first value 270 is associated to a quality of the I component sample 265. From the second quality detector 215, a second value 275 is output. The second value 275 is associated to a quality of the Q component sample 265. As will be described later, the first and second values 270, 275 may be associated with several respective I and Q component samples 260, 265.

In the comparison unit 220, the first value 270 and the second value 275 are compared. In this example, the comparison unit 220 computes the difference between the respective first and second value. The comparison results in an error signal 280.

The comparison result, i.e. the error signal 280 in this example, is then used by the adjustment unit 225 to adjust the sampling timing to improve the sample quality for sampling to come. This may be done by adjusting the timing of a clock signal setting the sampling timing in the ADCs 200, 205, for example by controlling the NCO 235 depicted in FIG. 2 which in turn controls the clock signal 255 that determines the sampling timing in the first ADC 200 and second ADC 205. The arrangement 120 hence comprises a feedback control loop for performing timing recovery, i.e. for adjusting the sampling timing to improve the sample quality.

The adjustment unit 225 may comprise a second order loop filter. The second order loop filter may include a proportional part that amplifies the error signal 280 and modifies the sampling timing an amount of time which is proportional to the error signal 280. This may be performed for example in a controller like the in FIG. 2 depicted controller 230.

In the arrangement 120, timing recovery is performed using only one I sample and one Q sample per IQ pair, i.e. without oversampling. How this is possible according to embodiments herein will be described in the following. Here too, reference will be made to the example in FIG. 2.

Thanks to the offset element 240, the respective Q component 250 enters the second ADC 205 a bit delayed compared to when the respective I component 245 enters the first ADC 200. Since both ADCs 200, 205 are controlled by the same clock signal 255, the I component 245 is ahead of the Q component 250 when sampling is performed. Therefore, for each IQ pair, a sampling instant of the respective I component 245 is ahead of a sampling instant for the respective Q component 250. Hence, the I component sample 260 is representative of a different sampling instant, or timing, than the Q component sample 265. Correspondingly, the first value 270 is associated with a quality of advanced sampling instants relative to the second value 275, which is associated with a quality of delayed sampling instants.

It is to be understood that the offset element 240 may in other embodiments instead be arranged to delay an input of the I component 245 to the first ADC 200.

Since the incoming respective I and Q components 245, 250 are corrupted by noise, the quality detection should not be based on a single IQ pair. Instead, the respective quality detectors 210, 215 may process several respective I and Q samples 260, 265 either batch-wise, or recursively over time. In the latter case, a low-pass filter may be used to produce an average value over a so called sliding window. Hence, the respective I and Q component sample quality, that is the respective first and second value 270, 275, may be determined using several samples, for example as an average of the most recent samples.

By comparing the quality of I component samples 260, which in this example are advanced relative to Q component samples 265, with the quality of Q component samples 265, it is possible to determine if the overall sampling timing, i.e. the setting of the clock signal 255, is to be advanced or delayed to improve the overall sample quality.

In this example, when the I component samples 260 are advanced relative to the Q component samples 265, the adjustment to be performed is to advance the sampling timing when the first value 270 indicates a better quality than the second value 275. Accordingly, if the second value 275 indicates the better quality, then the adjustment of the sampling timing should be a delaying of the sampling timing for subsequent sampling. Hence, thanks to the relative offset between the I component sampling and the Q component sampling, the direction of a sampling timing error may be determined based on only one IQ sample pair per symbol, and based on this a so called closed loop timing recovery may be performed.

Figure 3:
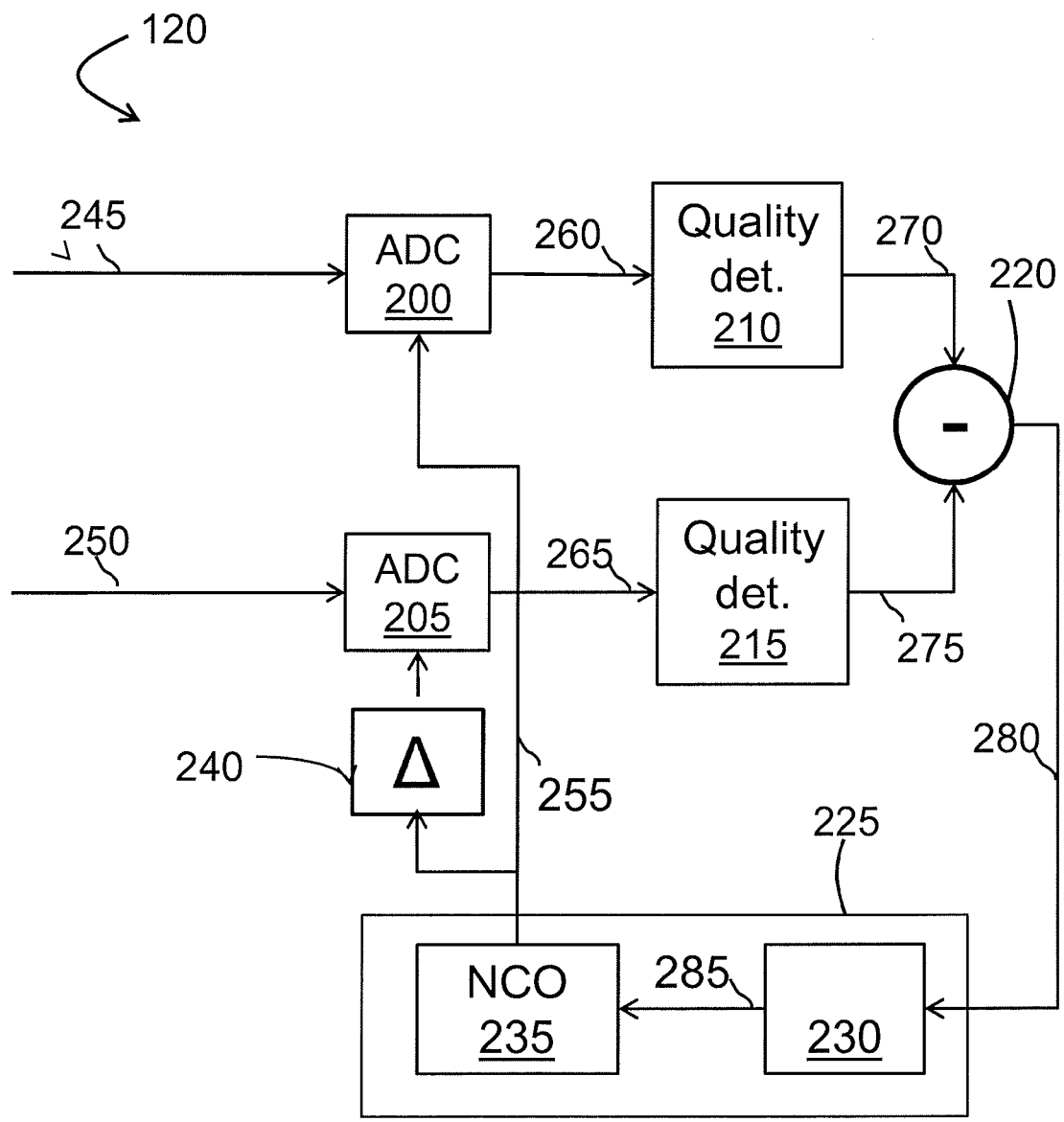
FIG. 3 is a schematic block diagram and flowchart illustrating embodiments of a method and an arrangement in a QAM receiver for performing timing recovery.

FIG. 3 schematically shows some alternative embodiments of the arrangement 120 depicted in FIG. 1. This figure is also a schematic combined block diagram and flowchart illustrating some embodiments of the arrangement 120 for performing timing recovery.

The arrangement 120 comprises the first ADC 200 and the second ADC 205. The arrangement 120 further comprises the first quality detector 210 and the second quality detector 215. The arrangement 120 further comprises a comparison unit 220.

Further comprised in the arrangement 120 is the adjustment unit 225, which in this example too comprises the controller 230 and the Numerically NCO 235. An offset element 240, which in this example is a delay element, is also comprised in the depicted arrangement 120.

The operation of the arrangement 120 will now also be described with reference to FIG. 3. When a symbol in the form of an IQ pair is received in the arrangement 120, the I component 245 of the IQ pair enters the first ADC 200, and the Q component 250 of the same IQ pair enters the second ADC 205.

The respective first and second ADC 200, 205 then sample the respective I and Q components (245, 250). The sampling timing is determined by the clock signal 255 from the NCO 235.

The output from the first ADC 200 is the I component sample 260 of the I component 245, which I component sample 260 then enters the first quality detector 210. Accordingly, the Q component sample 265 of the Q component 250 is output from the second ADC 205, and enters the second quality detector 215.

From the first quality detector 210, the first value 270 is output. The first value 270 is associated to a quality of the I component sample 265. From the second quality detector 215, the second value 275 is output. The second value 275 is associated to a quality of the Q component sample 265. The first and second values 270, 275 may be associated with several respective I and Q component samples 260, 265.

In the comparison unit 220, the first value 270 and the second value 275 are compared. In this example, the comparison unit 220 computes the difference between the respective first and second value. The comparison results in an error signal 280.

The comparison result, i.e. the error signal 280 in this example, is then used by the adjustment unit 225 to adjust the sampling timing to improve the sample quality for sampling to come. This may be done by adjusting the timing of a clock signal setting the sampling timing in the ADCs 200, 205, for example by controlling the NCO 235 depicted in FIG. 3 which in turn controls the clock signal 255 that determines the sampling timing in the first ADC 200 and second ADC 205. The arrangement 120 hence comprises a feedback control loop for performing timing recovery, i.e. for adjusting the sampling timing to improve the sample quality.

The adjustment unit 225 may comprise a second order loop filter. The second order loop filter may include a proportional part that amplifies the error signal 280 and modifies the sampling timing an amount of time which is proportional to the error signal 280. This may be performed for example in a controller like the in FIG. 3 depicted controller 230.

In the arrangement 120, timing recovery is performed using only one I sample and one Q sample per IQ pair, i.e.

without oversampling. How this is possible according to embodiments herein will be described in the following. Here too, reference will be made to the example in FIG. 3.

Thanks to the offset element 240, a relative timing offset between the I component 245 sampling and the Q component 250 sampling is achieved, since the offset element 240 delays an input of the clock signal 255 into the second ADC 205 relative to an input of the clock signal 255 into the first ADC 200. It is to be understood that in other embodiments, the clock signal 255 may instead be delayed into the first ADC 200, whereby the I component is delayed in relation to the Q component.

Therefore, for each IQ pair, a sampling instant of the respective I component 245 is ahead of a sampling instant for the respective Q component 250. Hence, the I component sample 260 is representative of a different sampling instant, or timing, than the Q component sample 265. Correspondingly, the first value 270 is associated with a quality of advanced sampling instants relative to the second value 275, which is associated with a quality of delayed sampling instants.

Since the incoming respective I and Q components 245, 250 are corrupted by noise, the quality detection should not be based on a single IQ pair. Instead, the respective quality detectors 210, 215 may process several respective I and Q samples 260, 265 either batch-wise, or recursively over time. In the latter case, a low-pass filter may be used to produce an average value over a so called sliding window. Hence, the respective I and Q component sample quality, that is the respective first and second value 270, 275, may be determined using several samples, for example as an average of the most recent samples.

By comparing the quality of I component samples 260, which in this example are advanced relative to Q component samples 265, with the quality of Q component samples 265, it is possible to determine if the overall sampling timing, i.e. the setting of the clock signal 255, is to be advanced or delayed to improve the overall sample quality.

Hence, thanks to the relative offset between the I component sampling and the Q component sampling, the direction of a sampling timing error may be determined based on only one IQ sample pair per symbol, and based on this a so called closed loop timing recovery may be performed.

Figure 4:
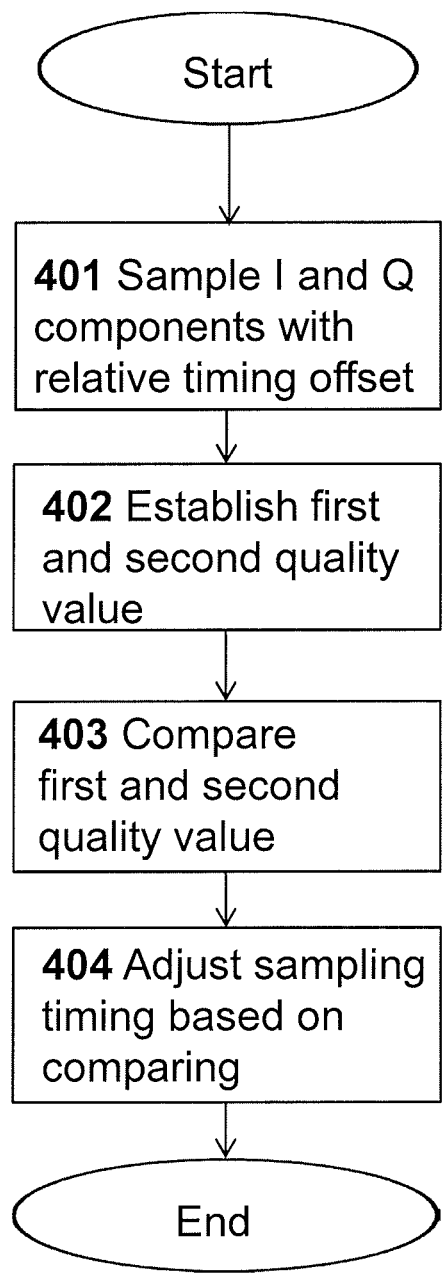
FIG. 4 is a schematic illustration of a method for performing timing recovery in a QAM receiver.

Embodiments herein, relating to a method in the QAM receiver 100 for performing timing recovery will now be further elaborated and described with reference to the flowchart depicted in FIG. 4. Here, embodiments herein will be described in a more general way, but reference will be made to the numerals in FIGS. 2 and 3 for the sake of clarity. As previously mentioned, the QAM receiver 100 is configured to receive a signal comprising a sequence of symbols, wherein each symbol is represented by a respective IQ pair comprising a respective in-phase I component and a respective quadrature Q component. The method comprises the following actions, which actions may be taken in any suitable order.

Action 401

In this action, the QAM receiver 100 samples the respective I component 245 and the respective Q component 250 of each IQ pair. The sampling is performed with a relative timing offset between the sampling of the respective I component 245 and the sampling of the respective Q component 250.

By relative timing offset is understood a relative offset in time.

As previously mentioned, in some embodiments the relative timing offset is provided by offsetting the I component 245 relative to the Q component 250 before sampling is performed. This may as previously described be performed by delaying one of the I and Q components, 245, 250 before they enter their respective ADC 200, 205.

In some embodiments, the relative timing offset is provided by offsetting the sampling instant of the I component 245 relative to the sampling instant of the Q component 250.

This may be done by delaying the clock signal 240 into one of the first and second ADCs 200, 205 as previously described, to provide the relative timing offset between the sampling instants in the first ADC 200, and the sampling instants in the second ADC 205.

Action 402

In this action, the QAM receiver 100 establishes the first value 270 associated to the quality of I component samples 260, and the second value 275 associated to the quality of Q component samples 265.

Since the incoming respective I and Q components 245, 250 may normally be corrupted by noise, the quality detection should not be based on a single IQ pair. Instead, the respective quality detectors 210, 215 may process several respective I and Q component samples 260, 265 either batch-wise, or recursively over time. In the latter case, a low-pass filter may be used to produce an average value over a so called sliding window. Hence, the respective first and second values 270, 275 may be determined using several respective samples 260, 265, for example as an average of the most recent respective samples 260, 265.

According to some embodiments, the respective first and second values are established as a respective mean magnitude of the respective I and Q component samples.

An advantage of such embodiments is that they do not require that carrier recovery has been performed, since they are valid independently of carrier recovery.

For example, for QAM-4, a nominal value for a magnitude may be 1 for all symbols, and hence for all nominal I components and Q components. The closer the mean sample magnitude is to 1 in this case, the better the quality of the samples, and hence the higher the quality value 270, 275 should be. Accordingly, a smaller mean sample magnitude than 1 corresponds to a worse sample quality, and in this case the quality value should be smaller, indicating a deviation from the optimal sampling timing.

For higher order QAM constellations, the magnitude may also be used in the quality detectors 210, 215, since in average the magnitude is larger after timing recovery, and hence a larger mean sample magnitude indicates a higher sample quality.

The respective first and second quality detectors 210, 215 may monitor the quality of the respective I component samples 260 and Q component samples 265 in relation to their respective nominal values. This may be referred to as decision directed feedback.

According to some embodiments, the respective first and second values 270, 275 are established as a respective mean magnitude of the difference between the respective I and Q component samples 260, 265 subtracted by the respective nominal I and Q values of an anticipated symbol corresponding to the respective IQ pair.

That is, in some embodiments, a decision feedback principle may be used to determine how far away from a decoded, or anticipated, symbol the respective I and Q component samples 260, 265 are. Such embodiments may be useful after carrier recovery has been performed. The respective mean magnitude of this deviation may then be used as the respective first and second quality value 270, 275. In this case, a small mean magnitude of the deviation indicates a good sample quality, and a large mean magnitude indicates a worse sample quality.

An advantage of using sample magnitudes when establishing the first and second values 270, 275, is that such computations are relatively easy to implement.

According to some embodiments, the respective first and second values 270, 275 are established as a respective variance of the respective I and Q component samples 260, 265.

It is to be understood that a standard deviation may be used instead of a variance.

Since the variance is the mean of the squared sample magnitudes if the mean sample value is zero, which is the case for QAM when considering the samples without decision control feedback, a high variance indicates a good sample quality.

An advantage of such embodiments is that they do not require that carrier recovery has been performed, since they are valid independently of carrier recovery.

In cases when decision feedback is used, the respective first and second values 270, 275 may be established as a respective variance of the difference between the respective I and Q component samples 260, 265 subtracted by respective nominal I and Q values of an anticipated symbol corresponding to the respective IQ pair.

That is, in some embodiments, a decision feedback principle may be used to determine how far away from a decoded, or anticipated, symbol the respective I and Q component samples 260, 265 are. A large variance in this case indicates a bad sample quality, and a small variance indicates a better sample quality.

Action 403

In this action, the QAM receiver 100 compares the first value 270 and the second value 275 to determine if the sampling timing should be advanced or delayed to improve the sample quality.

In some embodiments, the sign of the error signal 280, or timing error, may be determined as the sign of the difference between the a respective quality measure, such as a variance or a standard deviation or a mean magnitude of the respective I and Q component samples 260, 265 taken at a large number of symbols, as previously described in relation to action 402 above.

Action 404

In this action, the QAM receiver 100 adjusts, to improve the sample quality, subsequent sampling by advancing or delaying a sampling timing based on the comparison 403, thereby performing timing recovery.

The sampling error, or error signal 280, may be used by an adjustment unit, such as the adjustment unit 225 in FIGS. 2 and 3, or controller to form a control loop which adjusts the sampling timing, i.e. sampling the instants, towards its optimum value.

The adjustment unit 225 may as previously described comprise the second order loop filter. The second order loop filter may comprise a proportional part that amplifies the error signal 280 and modifies the sampling timing an amount of time which is proportional to the error signal 280. This may be performed for example in a controller 230 as depicted in FIGS. 2 and 3. The second order loop filter may further comprise an integral part that integrates the error signal 280 over time. The change in sampling timing may then be proportional to the integral of the error signal 280. In this way, also a symbol rate offset may be handled, since a symbol rate offset yields a timing error that grows linearly over time, which may not be handled by a proportional adjustment unit, or controller alone. Thus, timing recovery may be achieved without carrier recovery. Other control structures than proportional and integral are also possible.

Figure 5:
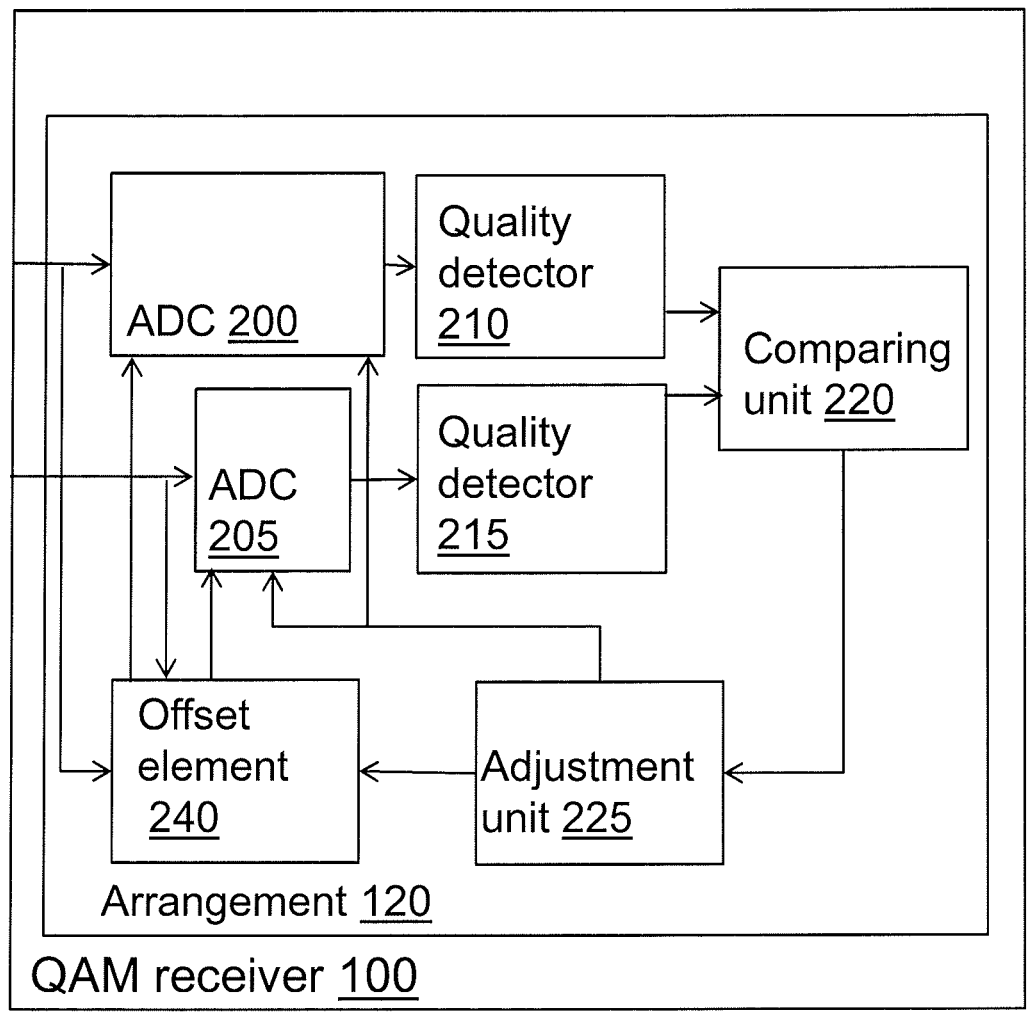
FIG. 5 is a schematic illustration of a QAM receiver comprising an arrangement for performing timing recovery.

To perform the actions above for performing timing recovery the quadrature QAM, receiver 100 comprises the arrangement 120, referred to in FIG. 1, exemplary embodiments of which are depicted in FIG. 2 and FIG. 3. The arrangement 120 is schematically and more generally depicted in FIG. 5. The term "configured to" used herein may also be referred to as "arranged to".

As previously mentioned, the QAM receiver 100 is configured to receive a signal comprising a sequence of symbols. Each symbol is represented by a respective IQ pair comprising a respective inphase component I and a respective quadrature component Q.

The arrangement 120 comprises the first ADC 200 configured to sample the respective I component 245 of each IQ pair.

The arrangement 120 comprises the second ADC 205 configured to sample the respective Q component 250 of each IQ pair.

The arrangement 120 comprises the offset element 240, configured to provide a relative timing offset between the sampling of the respective I component and the sampling of the respective Q component. As previously mentioned, the offset element may be a delay element.

According to some embodiments, the offset element 240 is configured to provide the relative timing offset by offsetting the I component relative to the Q component before sampling is performed.

According to some embodiments, the offset element 120 is configured to provide the relative timing offset by offsetting the sampling instant of the I component relative to the sampling instant of the Q component.

The arrangement 120 further comprises the first quality detector 210, configured to establish the first value 270 associated to a quality of I component samples 245, and a second quality detector 215 configured to establish a second value 275 associated to a quality of Q component samples 265.

According to some embodiments, the respective first and second values 270, 275 are established as a mean magnitude of the respective I and Q component samples 260, 265.

According to some embodiments, the respective first and second values 270, 275 are established as a respective mean magnitude of the difference between the respective I and Q component samples subtracted by the respective nominal I and Q values of an anticipated symbol corresponding to the respective IQ pair.

According to some embodiments, the respective first and second values 270, 275 are established as a variance of the respective I and Q component samples 260, 265.

According to some embodiments, the respective first and second values 270, 275 are established as a respective variance of the difference between the respective I and Q component samples 260, 265 subtracted by the respective nominal I and Q values of an anticipated symbol corresponding to the respective IQ pair.

The arrangement 120 comprises a comparing unit 220 configured to compare the first value 270 and second value 275 to determine if the sampling timing should be advanced or delayed to improve the sample quality.

The arrangement 120 comprises an adjustment unit 225 configured to adjust, to improve the sample quality, subsequent sampling by advancing or delaying a sampling timing based on a result from the comparing unit 220, thereby performing timing recovery.

As previously described, some embodiments herein utilize the standard deviation, or variance, of the I component samples 260 and the Q component samples 265, where the standard deviation is as largest at the optimum time instant when the I and Q components are as largest. By comparing the two standard deviations or variances, it is possible to judge which of the I component 245 and the Q component 250 is sampled closest to the optimum time instant, and therefore to estimate the sign of the sampling timing error. The standard deviation value may be replaced by the average of the absolute values, or magnitude, of the I and Q component samples 160, 165 in order to simplify the computations.

Other embodiments utilize the variation of the I component samples 260 and the Q component samples 265 around each constellation point, or nominal value. In this case, the variation, measured as for example standard deviation, of the I component samples 260 or the Q component samples 265 is as smallest close to the optimum sampling instant. By comparing the two variations, it is possible to judge which of the I component 245 and the Q component 250 is sampled closest to the optimum time instant and therefore to estimate the sign of the sampling time error.

An advantage of embodiments herein is that they, thanks to the relative offset between the I component sampling and the Q component sampling, facilitate timing recovery by requiring only one IQ pair sampling per symbol.

When using the word "comprise" or "comprising" it shall be interpreted as non-limiting, i.e. meaning "consist at least of".

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a quadrature amplitude modulation (QAM) receiver for performing timing recovery, wherein the QAM receiver is configured to receive a signal comprising a sequence of symbols, wherein each symbol is represented by a respective IQ pair comprising a respective In-phase (I) component and a respective Quadrature (Q) component, the method comprising:
   sampling the respective I component and the respective Q component of each IQ pair, wherein the sampling is performed with a relative timing offset between the sampling of the respective I component and the sampling of the respective Q component;
   establishing a first value associated with a quality of I component samples;
   establishing a second value associated with a quality of Q component samples;
   comparing the first value and the second value to determine if a sampling timing should be advanced or delayed to improve the sample quality; and
   adjusting, to improve the sample quality, subsequent sampling by advancing or delaying the sampling timing based on the comparison between the first and second values to perform timing recovery.

2. The method according to claim 1, wherein the relative timing offset is provided by offsetting the I component relative to the Q component before sampling is performed.

3. The method according to claim 1, wherein the relative timing offset is provided by offsetting a sampling instant of the I component relative to a sampling instant of the Q component.

4. The method according to claim 1, wherein the respective first and second values are each established as a mean magnitude of the respective I and Q component samples.

5. The method according to claim 1, wherein:
   the first value is established as a mean magnitude of a difference between the I component sample and a nominal I value of an anticipated symbol of the corresponding IQ pair; and the second value is established as a mean magnitude of a difference between the Q component sample and a nominal Q value of the anticipated symbol of the corresponding IQ pair.

6. The method according to claim 1, wherein the respective first and second values are each established as a variance of the respective I and Q component samples.

7. The method according to claim 1, wherein:
the first value is established as a variance of a difference between the I component sample and a nominal I value of an anticipated symbol of the corresponding IQ pair; and
the second value is established as a variance of a difference between the Q component sample and a nominal Q value of the anticipated symbol of the corresponding IQ pair.

8. A quadrature amplitude modulation (QAM) receiver comprising an arrangement for performing timing recovery, wherein the QAM receiver is configured to receive a signal comprising a sequence of symbols, wherein each symbol is represented by a respective IQ pair comprising a respective In-phase (I) component and a respective Quadrature (Q) component, the arrangement comprising:
a first analog to digital converter (ADC) configured to sample the respective I component of each IQ pair;
a second ADC configured to sample the respective Q component of each IQ pair;
an offset element configured to provide a relative timing offset between the sampling of the respective I component and the sampling of the respective Q component;
a first quality detector configured to establish a first value associated with a quality of I component samples;
a second quality detector configured to establish a second value associated with a quality of Q component samples;
a comparing unit configured to compare the first value and the second value to determine if a sampling timing is to be advanced or delayed to improve the sample quality; and
an adjustment unit configured to adjust, to improve the sample quality, subsequent sampling by advancing or delaying the sampling timing based on a result from the comparing unit, thereby performing timing recovery.

9. The QAM receiver according to claim 8, wherein the offset element is configured to provide the relative timing offset by offsetting the I component relative to the Q component before sampling is performed.

10. The QAM receiver according to claim 8, wherein the offset element is configured to provide the relative timing offset by offsetting a sampling instant of the I component relative to a sampling instant of the Q component.

11. The QAM receiver according to claim 8, wherein the respective first and second values are each established as a mean magnitude of the respective I and Q component samples.

12. The QAM receiver according to claim 8, wherein:
the first value is established as a mean magnitude of a difference between the I component sample and a nominal I value of an anticipated symbol of the corresponding IQ pair; and
the second value is established as a mean magnitude of a difference between the Q component sample and a nominal Q value of the anticipated symbol of the corresponding IQ pair.

13. The QAM receiver according to claim 8, wherein the respective first and second values are each established as a variance of the respective I and Q component samples.

14. The QAM receiver according to claim 8, wherein:
the first value is established as a variance of a difference between the I component sample and a nominal I value of an anticipated symbol of the corresponding IQ pair; and
the second value is established as a variance of a difference between the Q component sample and a nominal Q value of the anticipated symbol of the corresponding IQ pair.

* * * * *